United States Patent [19]

Kishi et al.

[11] Patent Number: 4,807,041
[45] Date of Patent: Feb. 21, 1989

[54] MICROFILM READER SCANNER CAPABLE OF EDITING IMAGE

[75] Inventors: Masamichi Kishi; Hiroya Sugawa, both of Osaka, Japan

[73] Assignee: Minolta Camera Kabushiki Kaisha, Osaka, Japan

[21] Appl. No.: 181,303

[22] Filed: Apr. 13, 1988

[30] Foreign Application Priority Data

Apr. 20, 1987 [JP] Japan .................................. 62-95185

[51] Int. Cl.⁴ ............................................. H04N 1/22
[52] U.S. Cl. .................... 358/256; 358/102; 358/236; 358/296; 358/347; 358/280; 358/283; 340/709
[58] Field of Search .............. 358/266, 102, 236, 296, 358/347, 280, 283; 340/709, 724

[56] References Cited

U.S. PATENT DOCUMENTS

| 4,503,468 | 3/1985 | Serinken et al. | 358/102 |
| 4,524,392 | 6/1985 | Poetsch | 358/102 |
| 4,694,354 | 9/1987 | Tamaka et al. | 358/102 |
| 4,700,237 | 10/1987 | Yoshioka et al. | 358/102 |

Primary Examiner—Edward L. Coles, Sr.
Attorney, Agent, or Firm—Price, Gess & Ubell

[57] ABSTRACT

A microfilm reader scanner for projecting an image on a microfilm onto a screen and also reading it through an image sensor, subjecting it to an editing process such as trimming or masking and thereafter outputting it to a laser beam printer or the like. An image editing area is specified using a touch panel disposed on the screen, and the editing area and an attribute thereof are inputted to a memory while observing the image projected on the screen. The image on the microfilm is read by the image sensor, converted to a digital signal, edited in accordance with the image editing area and the attribute thereof both stored in the memory, and then outputted to a laser printer or the like.

18 Claims, 8 Drawing Sheets

F I G. 4(a)
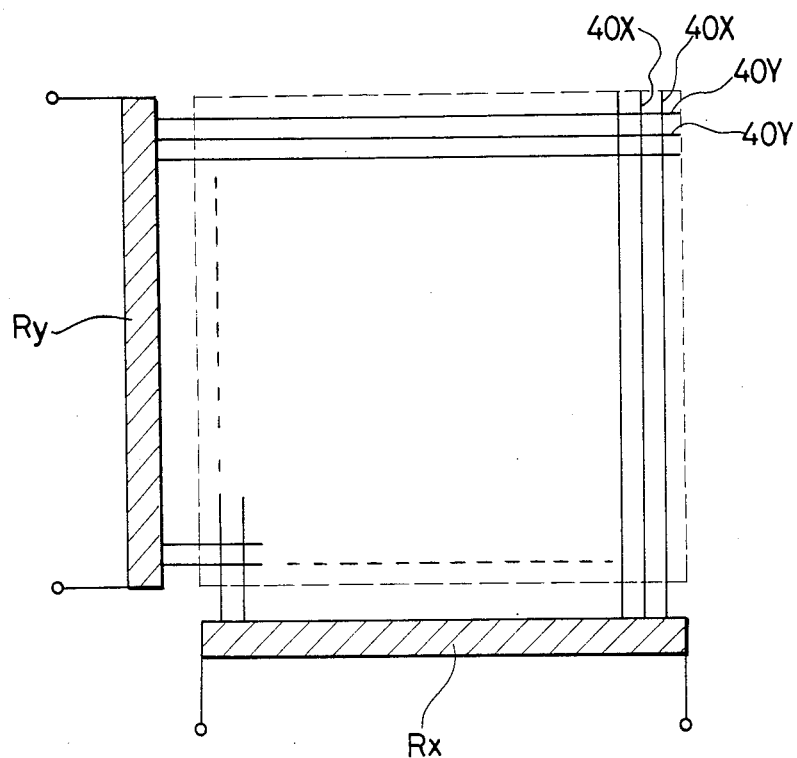
F I G. 4(b)
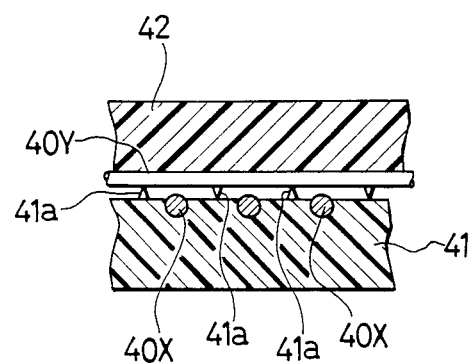

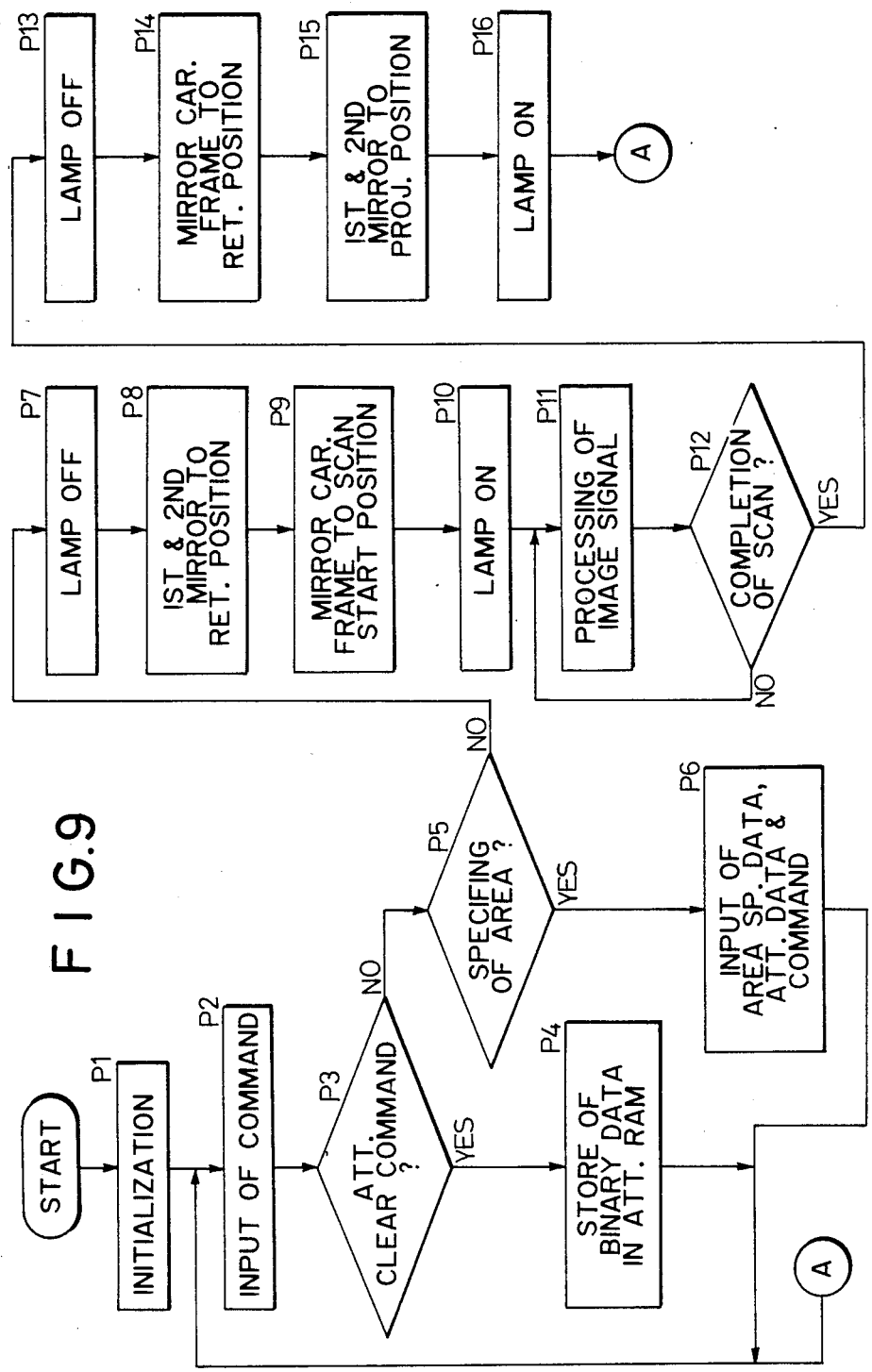

MICROFILM READER SCANNER CAPABLE OF EDITING IMAGE

BACKGROUND OF THE INVENTION

The present invention relates to a microfilm reader scanner which projects an image on a microfilm onto a screen for observing or reads and edits such image and outputs it to an image forming apparatus.

With increase in the use of microfilm as an information recording media, there has been an increasing demand for image editing, for example, for masking a portion of information recorded on a microfilm or for trimming the marginal portion while leaving the other portion.

To meet such a demand there has been developed a microfilm reader printer having an image editing function. More particularly, for example, in an electrophotographic type microfilm reader printer, shutters are disposed in an optical projection path for interrupting an image light therethrough, and when it is necessary to mask an image, the shutter is operated to cut off a part of the image light in accordance with the portion to be masked.

In the above conventional reader printer having an image editing function, due to the structural restriction of disposing shutters in the optical projection path, the image to be projected is divided into relatively large blocks and image editing such as masking or trimming is performed for each unit of the divided blocks, so it has been impossible to effect a minute editing in a small area of an image and that in a desired shape.

SUMMARY OF THE INVENTION

It is a primary object of the present invention to provide a microfilm reader scanner capable of specifying a desired portion of an image on a microfilm and performing an editing process such as trimming or masking.

It is another object of the present invention to provide a microfilm reader scanner capable of setting an editing area while observing an image on a microfilm projected on a screen.

The above and other objects and features of the present invention will become apparent from the following detailed description and the accompanying drawings.

BRIEF DESCRIPTION OF THE DRAWINGS

FIGS. 1 and 2 are sectional views showing a principal construction of a microfilm reader scanner embodying the present invention, of which FIG. 1 shows a state of projecting an image on a microfilm onto a screen and FIG. 2 shows a state of projecting such microfilm image onto an image pickup element;

FIGS. 4 (a) and (b) are diagrams showing a structure of the pressure sensor;

FIG. 9 is a flowchart showing an image editing process.

DETAILED DESCRIPTION OF THE PREFERRED EMBODIMENTS

An embodiment of the present invention will be described hereinunder.

[Principal Construction of Microfilm Reader Scanner]

Figure 1:
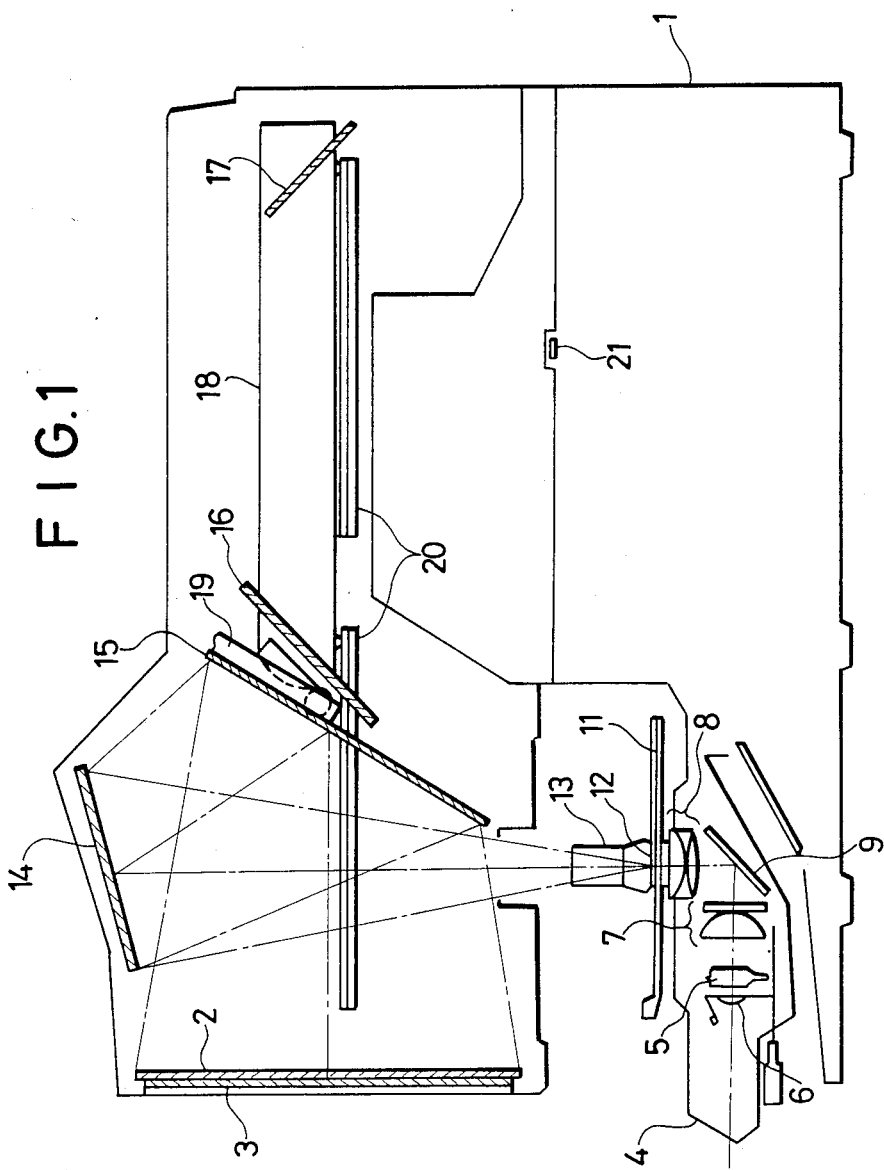

Referring to FIG. 1, there is illustrated in sectional view a principal construction of a microfilm reader scanner 1 embodying the present invention, in which the numeral 2 denotes a screen onto which is projected an image on a microfilm, with a later-described, transparent sheet-like pressure sensor 3 being sticked on the surface of the screen 2. The pressure sensor 3 functions to specify an image editing area and input operation commands for the microfilm reader scanner. Numeral 4 denotes a lamp house in which are incorporated a lighting lamp 5 and an optical lighting system comprising a reflecting mirror 6, condenser lenses 7, 8 and a mirror 9. Numeral 11 denotes a film carrier and numeral 12 denotes a microfilm held on the film carrier. Numerals 13, 14 and 15 denote a projection lens, a first mirror and a second mirror, respectively, which constitute an optical projection system for projecting an image on the microfilm onto the screen 2.

Further, numeral 21 denotes a CCD line sensor for converting an image on the microfilm into an electric signal. The CCD line sensor 21 has a capacity corresponding to one line in a main scanning direction of the image on the microfilm. Numerals 16 and 17 denote third and fourth mirrors, respectively, which are mounted on a mirror carriage frame 18 adapted to move along the upper surfaces of carriage rails 20 provided outside the optical projection path. The projection lens 13, the third mirror 16 and the fourth mirror 17 constitute an optical projection system for projecting an image on the microfilm onto the CCD line sensor 21.

Figure 2:
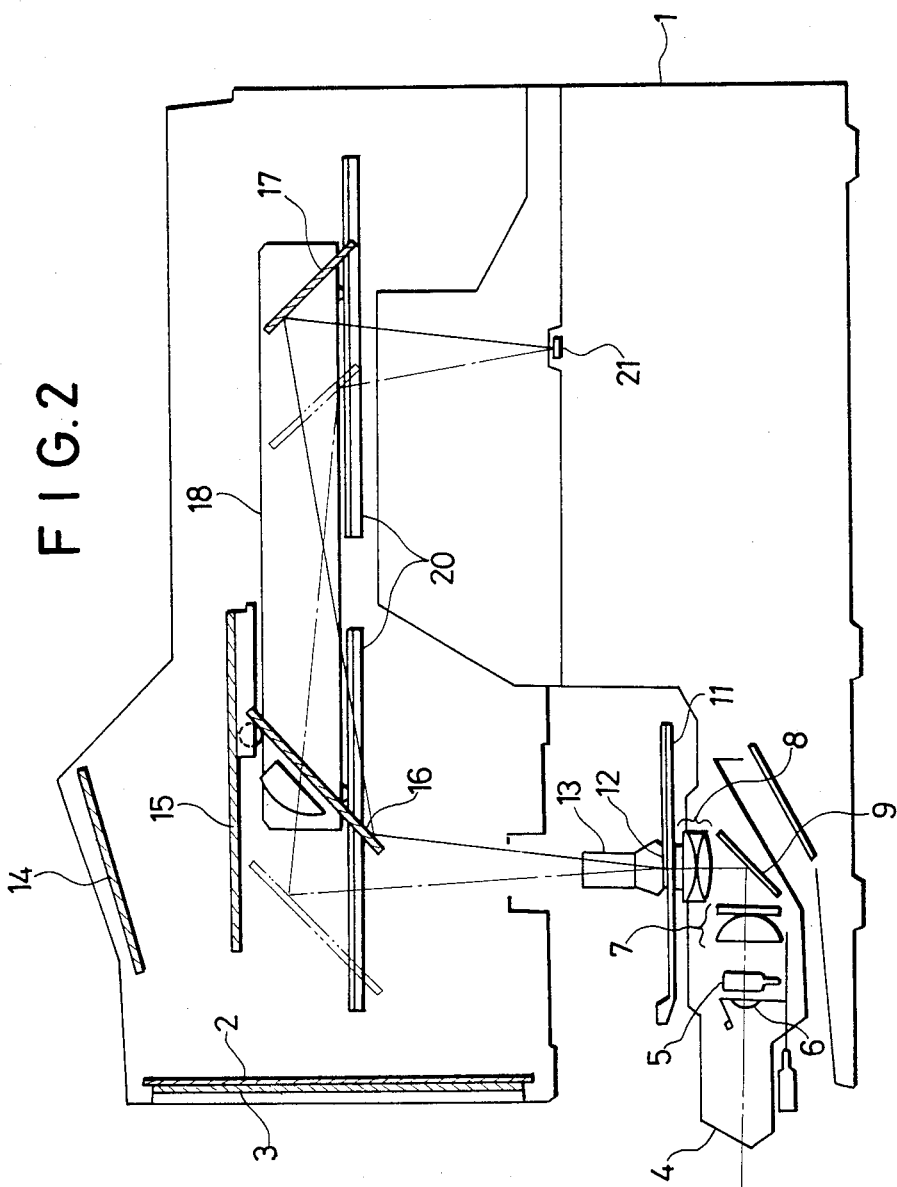

In projecting the image on the microfilm 12 onto the screen 2, the mirror carriage frame 18 moves backward (rightward in FIG. 1) to assume a retracted or stand-by position as shown in FIG. 1 and the first and second mirrors 14 and 15 are set to the respective illustrated positions. In projecting the image on the microfilm 12 onto the CCD 21, the first and second mirrors 14 and 15 are moved upward for stand-by and the mirror carriage frame 18 is moved forward (leftward in FIG. 2) as shown in FIG. 2 to form an optical projection path extending from the projection lens 13 to the CCD line sensor 21 through the third mirror 16 and the fourth mirror 17. The mirror carriage frame 18 is driven mechanism (not shown) is driven with a subsidiary scan signal provided from a later-described CPU 50, to effect scan in a subsidiary scanning direction.

In this embodiment there is adopted a construction in which, when an image on the microfilm is projected onto the CCD line sensor 21, it is projected on a larger scale using the projection lens 13, and as the CCD line sensor 21 there is used one having a length corresponding to the magnification of enlargement to improve resolution. More specifically, the number of picture elements per unit length of the CCD line sensor is a value peculiar to the CCD, so between CCD line sensors having the same number of picture elements, resolution is improved according to the magnification of enlargement in the case of reading the image on a larger scale as compared with reading it at an equal magnification. For example, in the case of reading an image on the microfilm at an equal magnification, a certain image area is incident on two picture elements of the CCD line sensor, while when the image is read at a magnification of 4X, the same image area is incident on eight picture elements of the CCD line sensor, therefore, resolution of 4X is obtained.

[Pressure Sensor]

Figure 3:
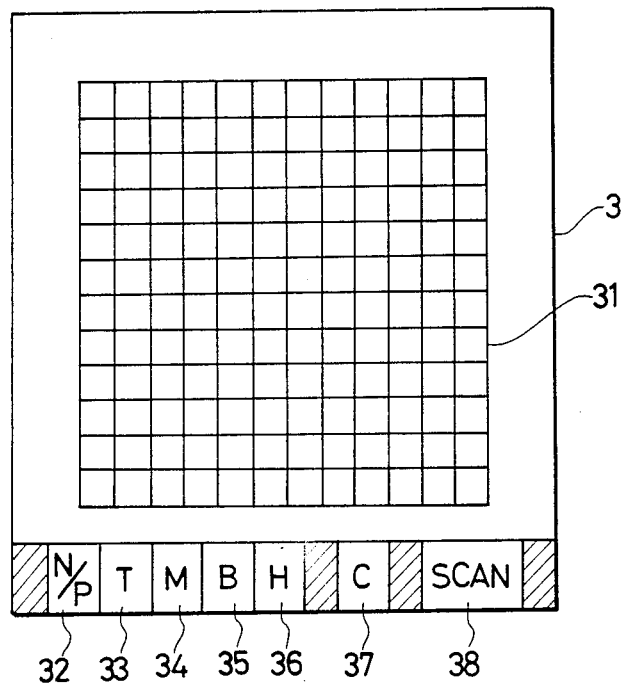
FIG. 3 is a front view of a pressure sensor.

The transparent, sheet-like pressure sensor 3 provided on the screen 2 will now be explained. FIG. 3 is a front view of the pressure sensor, in which there are printed a section paper-like scale 31 used when specifying an editing area on the microfilm and touch keys 32-38 disposed below the scale 31 for inputting an attribute about the editing area as well as an operation command for the reader scanner. More specifically, the touch key 32 is a reversal/non-reversal key; the key 33 is a trimming key; the key 34 is a masking key; the key 35 is a key which indicates a binarization processing for image signals; the key 36 is a key which indicates a half tone processing for image signals; the key 37 is a clear key for cancelling an inputted data, indications, etc.; and the key 38 is a scan start command key.

The pressure sensor 3 has such a structure as shown in front view in FIG. 4 (a) and in partially sectional view in FIG. 4 (b). As is seen in these figures, a transparent polycarbonate film 41 with ultrafine wires 40X of a metal such as stainless steel being embedded at a pitch of 1 mm in a 2–5 μm exposed state, and a polycarbonate film 42 with like ultrafine wires 40Y embedded in the same manner, are put one upon the other through spacers 41a so that the exposed surfaces of the ultrafine wires 40X and 40Y are opposed inside and perpendicularly to each other. The polycarbonate films 41 and 42 are disposed so that the ultrafine wires 40X and 40Y embedded therein are in parallel with the scale 31. The ultrafine wires 40X in the X direction and the like wires 40Y in the Y direction are normally held out of contact with each other by means of the spacers 41a. Only when a surface portion is pressed with a touch pen or the like, the ultrafine wires 40X and 40Y located in the pressed portion come into contact with each other. A group of contacts arranged in the form of a 1 mm pitch net is constituted.

Figure 5:
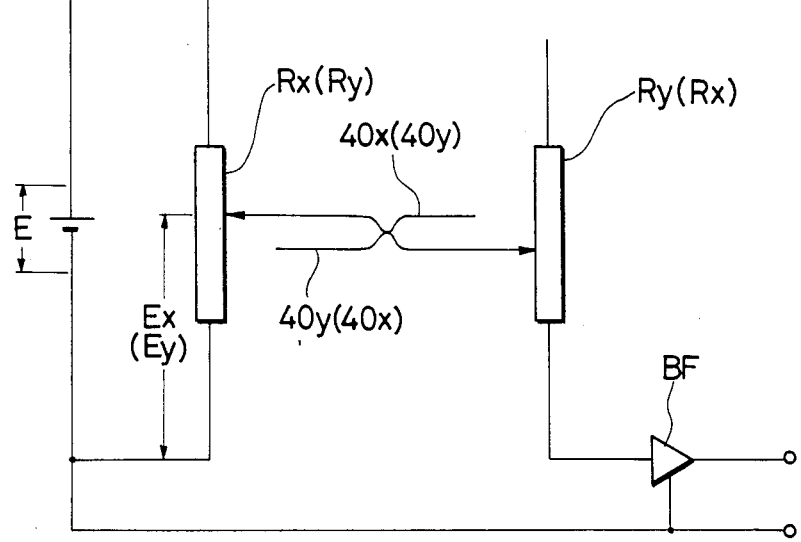
FIG. 5 is an explanatory view of a circuit for reading a position on the pressure sensor.

In order to detect the position of contact of the ultrafine wires 40X and 40Y, the ultrafine wires 40X are connected at one end thereof to a resistor RX having intermediate terminals of a number corresponding to the number of the ultrafine wires, and the ultrafine wires 40Y are also connected at one end thereof to a like resistor RY. For detecting X coordinates of the contact position, a voltage E is applied across the resistor RX, with no voltage applied to the resistor RY. At this time, a voltage $E_X$ corresponding to the terminal position to which the ultrafine wire 40X is connected, namely X coordinates, appears on an output side of a high impedance buffer BF connected to one end of the resistor RY, through the ultrafine wire 40X, the like wire 40Y in contact therewith and the resistor RY, due to the current flowing through the resistor RY, whereby the position of X coordinates can be detected. Y coordinates can also be detected by the same means as above. The parenthesized marks in FIG. 5 indicate marks used in detecting the position of Y coordinates.

The area enclosed by two adjacent ultrafine wires 40X and 40Y serves as an input unit area of the pressure sensor. This unit area has contacts at four corners.

[Image Processing Circuit]

Figure 6:
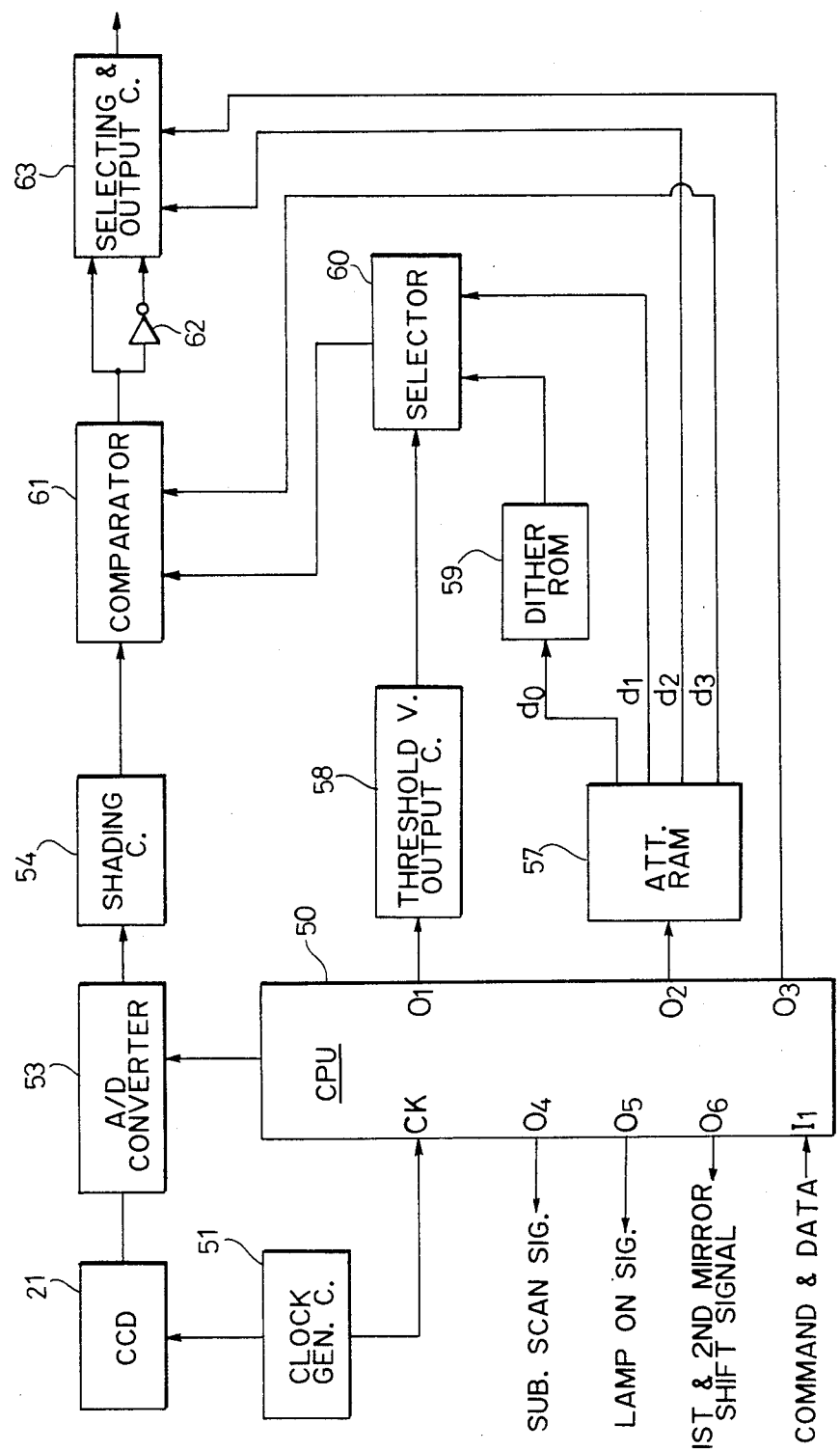
FIG. 6 is a block diagram of an image processing circuit.

FIG. 6 is a block diagram of an image processing circuit for reading an image on the microfilm and editing image signals based on the specified area and attribute thereof both inputted from the pressure sensor 3 on the screen 2.

In the figure, the numeral 50 denotes an image processing CPU and numeral 51 denotes a clock generating circuit which supplies a clock signal to the CPU 50 and also supplies a sample hold signal to CCD. Numeral 21 denotes a CCD for converting the image on the microfilm which has been projected through the optical projection system, into an electric signal. The CCD 21 has picture elements of a number corresponding to one line in the main scanning direction. Numeral 53 denotes an A/D converter for converting an analog image signal outputted from the CCD into a digital image signal. Numeral 54 denotes a shading circuit which corrects unevenness in the quantity of light in the main scanning direction contained in the image signal outputted from the A/D converter 53 and also corrects variations in sensitivity between picture elements of the CCD. Numeral 58 denotes a threshold value outputting circuit which outputs a threshold value serving as a reference value in sorting read image signals into a binary of black and white.

Numeral 57 denotes an attribute RAM having memory areas corresponding to the input units of the pressure sensor 3. Data indicative of attribute inputted from the pressure sensor 3 is stored in a memory area corresponding to the specified area thereof. One input unit in the pressure sensor 3 corresponds to an area larger than one pixel of the CCD.

The attribute RAM 57 has a capacity corresponding to one frame of the microfilm.

Each attribute data stored in the attribute RAM comprises four bits ($d_3$, $d_2$, $d_1$, $d_0$), each bit representing the attribute information shown in Table 1. That is, $d_0$ specifies either of two dither patterns; $d_1$ specifies either a binarization processing (black/white processing) or a later-described dither processing (half tone processing); $d_2$ specifies black/white reversal processing; and $d_3$ specifies an erasing or masking processing, i.e. white processing.

TABLE 1

| Bit | Attribute Information |
| --- | --- |
| $d_3$ | White/Effective Picture Element |
| $d_2$ | Reversal/Non-reversal |
| $d_1$ | Binary Data/Dither |
| $d_0$ | Dither Pattern 1/Dither Pattern 2 |

The 4-bit attribute data specifies the eight kinds of attributes shown in Table 2, wherein the mark X represents 0 or 1.

TABLE 2

| $d_3$ | $d_2$ | $d_1$ | $d_0$ | Attribute Data |
| --- | --- | --- | --- | --- |
| 1 | 1 | 1 | X | Binary Data |
| 1 | 1 | 0 | 1 | Dither 1 |
| 1 | 1 | 0 | 0 | Dither 2 |
| 1 | 0 | 1 | X | Reversed Binary Data |
| 1 | 0 | 0 | 1 | Reversed Dither 1 |
| 1 | 0 | 0 | 0 | Reversed Dither 2 |
| 0 | 1 | X | X | White |
| 0 | 0 | X | X | Black |

Signals of these bits $d_3$, $d_2$, $d_1$ and $d_0$ are outputted to a comparator circuit 61, a selecting and output circuit 63, a selector 60 and a dither ROM 59, respectively, specifying attributes of the image on the microfilm to be processed.

The dither ROM 59 stores a special pattern for performing a half tone processing from image signals and it is used in a processing for representing an image density in terms of a percent area occupancy of black dots in a very small area, utilizing an integral effect of man's sense of sight when reproducing a half tone such as a photograph. More specifically, a density level of each picture element of the original is compared with a preset threshold level, for example sixteen levels arranged in a 4×4 matrix, and when it is larger than the threshold value, the picture element is outputted as white, while if it is smaller than the threshold value, the picture element is outputted as black. Light and shade of image are expressed in terms of black dots in the matrix and in the above example there are expressed sixteen gradations.

The selector 60 judges an attribute signal for each area stored in the attribute RAM 57 and selects a threshold value outputted from the threshold value outputting circuit 58 or a half tone processing signal outputted from the dither ROM 59. The comparator circuit 61 compares the image signal provided from the shading circuit 54 with a processing signal according to the attribute of each area provided from the selector 60 and outputs a binarized image signal or a half tone-processed image signal, according to each area. To the comparator circuit 61 is also fed from the attribute RAM 57 a signal which specifies erasing or masking of a specific area. In response to this signal, the output of image signals in that area is stopped and a white signal is outputted. Numeral 62 denotes an inverter which reverses the image signal provided from the comparator circuit 61, whereby even a white image on a black ground often found in a microfilm can be outputted as a black image on a white ground. The selecting and output circuit 63 selects and outputs either a normal image or a reversed image according to each attribute stored in the attribute RAM 57. A threshold value output command signal is fed to the threshold value outputting circuit 58 from an output port $O_1$ of the CPU 50. Likewise, from an output port $O_2$, the area specifying signal and the signal indicative of the attribute thereof, which have been inputted from the pressure sensor 3, are outputted to the attribute RAM 57, and the read thereof is controlled. From an output port $O_3$, an output control signal for the image signal is outputted to the select and output circuit 63. Further, a subsidiary scan signal, a lamp ON signal, and first and second mirror shift signals, are provided from output ports $O_4$ to $O_6$ to a mirror carriage frame driving mechanism (not shown). To an input port $I_1$ there are fed area specifying data and other command signals from the pressure sensor 3. It goes without saying that signals required for control, though not shown, are fed to and outputted from the CPU 50.

[Specifying Image Editing Area and Attribute]

The following description is now provided about specifying an image editing area and an attribute thereof which is performed from the pressure sensor 3.

Figure 7A:
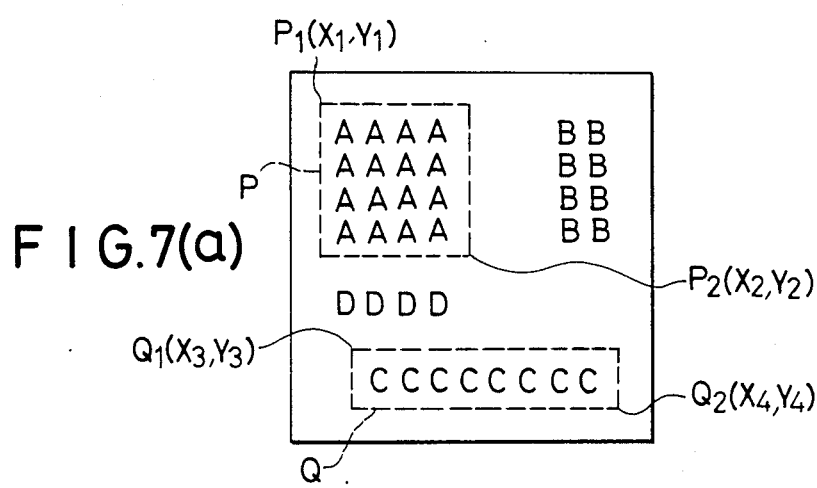
FIGS. 7 (a), (b) and (c) are explanatory views of an image trimming process.
Figure 7B:
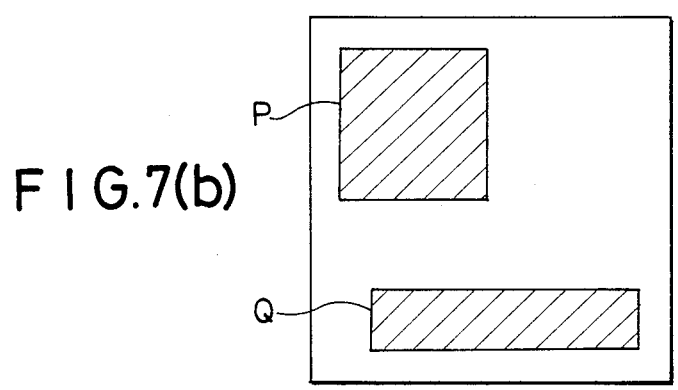
Figure 7C:
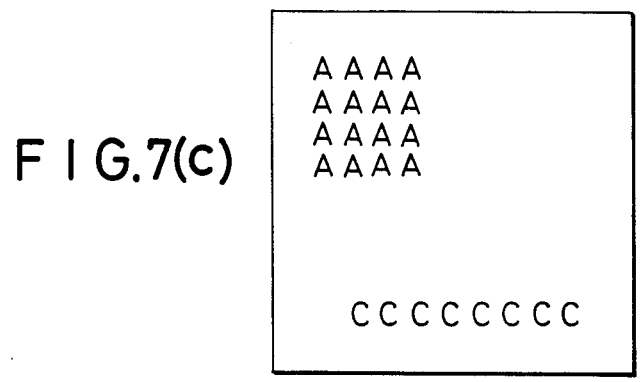

As an example, a processing for trimming will here be explained which is for leaving only a specific portion of an image on the microfilm and erasing the other portion. First, as shown in FIG. 7 (a), for the image on the microfilm projected on the screen 2, an area to be left on the picture plane is specified. More specifically, when there are character A, B, C and D areas and only the character A area "P" and the character C area "Q" are to be left and the others erased, first in order to specify the contour of the area P, two points $P_1$ and $P_2$ [coordinates $(X_1, Y_1)$, $(X_2, Y_2)$] on a diagonal line in the rectangular area are pressed with a touch pen from above the pressure sensor 3 formed on the screen 2. Further, out of the touch keys provided below the pressure sensor 3, the trimming key 33 and the binarization processing key 35 are depressed. As a result, the ultrafine wires 40X and 40Y located in the corresponding positions in the pressure sensor 3 come into contact with each other. This positional data is processed in the CPU 50 and a signal specifying the area P as well as data for trimming that area and specifying a binarization processing for that area are stored in the attribute RAM 57.

The same processing as for the area P is also applied to the character C area "Q". FIG. 7 (b) shows the specified areas and attributes which have been stored in the attribute RAM 57 after the above processing. When the image shown in FIG. 7 (a) is processed with the contents stored in the attribute RAM 57 and shown in FIG. 7 (b), there is obtained such an image output as shown in FIG. 7 (c).

Figure 8A:
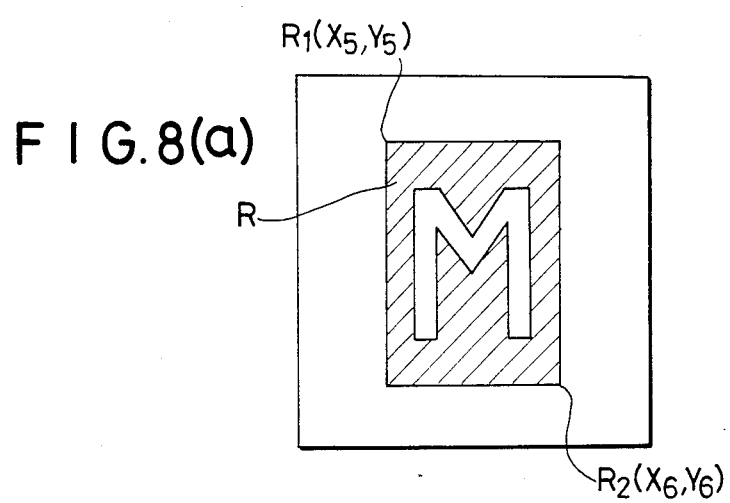
FIGS. 8 (a), (b) and (c) are explanatory views of an image reversing process.
Figure 8B:
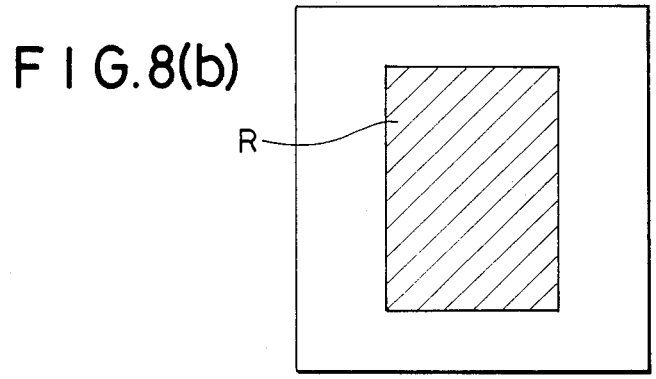
Figure 8C:
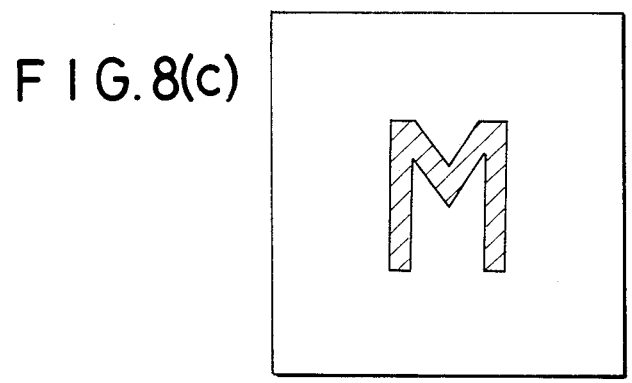

FIG. 8 shows an example of a processing for reversing an image on the microfilm, in which when an area R is to be reversed, two points $R_1$ and $R_2$ on a diagonal line are pressed with a touch pen from above the pressure sensor 3. Further, out of the touch keys, the reversal/non-reversal processing key 32 is depressed, whereby data which specifies a reversal processing for the area Q is stored in the attribute RAM 57. FIG. 8 (a) shows the image projected on the screen 2 and the specified are R; FIG. 8 (b) shows the specified area R and its attribute stored in the attribute RAM 57; and FIG. 8 (c) shows an image obtained by processing the image shown in FIG. 8 (a) with the contents stored in the attribute RAM 57.

The above area specifying operation involves inputting two points on a diagonal line and specifying a rectangular area with the said two points as vertexes. But it is also possible to input two points or more and form a figure joining those points in the CPU, thereby specifying an area of a shape other than rectangle.

[Operation]

The operation of the microfilm reader scanner of the present invention will now be described. The microfilm 12 is set on the film carrier 11 and the power source is turned ON. In this state, the first and second mirrors 14 and 15 are set in the screen projecting positions shown in FIG. 1, so upon lighting of the lamp 5 the image on the microfilm is projected onto the screen. As previously noted, while looking at the projected image, an editing area and an attribute thereof are specified by the pressure sensor 3, then fed to the CPU 50 and stored in the attribute RAM 57. Now that the image editing area and its attribute were specified, execution passes to reading of the image by the CCD. Out of the touch keys on the pressure sensor 3, the scan key 38 is depressed to input a scan start command to the CPU 50. Upon receipt of this command the CPU 50 starts the following image read control. First, the lamp 5 is turned OFF and the first and second mirrors 14 and 15 are moved to the respective retracted positions shown in FIG. 2. Then, the mirror carriage frame 18 is moved to its scan start position and the lamp 5 is turned ON. Scan is started. Image signals of one line in the main scanning direction are read by the CCD 21 and inputted to the comparator circuit 61 through the A/D converter 53 and the shading circuit 54.

On the other hand, from the attribute RAM 57 there are outputted attribute data $d_3$–$d_0$ corresponding to specified areas. A binarizing signal provided from the attribute RAM 57 or a half tone processing signal from the ROM 59 are selected in accordance with the attribute data $d_1$ fed to the selector 60, and are outputted to the comparator circuit 61. If the attribute is white, a white signal $d_3$ is outputted directly to the comparator circuit 61 to erase or mask the image.

The image signal and attribute data fed to the comparator circuit 61 correspond positionally to each other on the image and are outputted synchronizedly to the comparator circuit 61, so the image signals fed successively to the comparator circuit 61 are processed with positionally corresponding attribute data. The comparator circuit 61 outputs a black/white image signal in the case where the attribute data is a binarizing signal and outputs a half tone image signal if the attribute data is a half tone processing signal. In the case of a white signal, it is processed as a white image without output of an image signal.

The image signals thus outputted from the comparator circuit 61 are fed directly to the selecting and output circuit 63 and at the same time subjected to a reversal processing in the inverter 62 and then fed to the circuit 63. The selecting and output circuit 63 selects a normal image signal or a reversed image signal in accordance with the attribute data $d_2$ provided from the attribute RAM 57, and outputs the selected signal to an output device (not shown), e.g. a laser beam printer.

The image processing for one line in the main scanning direction is now over. In this case, since the mirror carriage frame 18 has shifted in a direction perpendicular to the main scanning direction to effect scan also in the subsidiary scanning direction, execution passes to the next scan in the main scanning direction.

When the scan in both main and subsidiary scanning directions of one frame of the image on the microfilm has been completed, the lamp 5 is turned OFF, the mirror carriage frame 18 is retracted to its position shown in FIG. 1, the first and second mirrors are moved to their screen projecting positions, and the lamp 5 is again turned ON. Now the preparation for processing the next frame of the microfilm is over.

FIG. 9 is a flowchart showing an outline of an image editing process which is executed by the CPU 50. After turning ON of the power, there is performed initialization, involving clearing of the memory in the CPU 50, clearing of the attribute RAM, setting of the first and second mirrors 14 and 15 to the projecting positions, and turning ON of the lamp (step P1). A command is received from the pressure sensor 3 (step P2). When the attribute clear key 37 is depressed and an attribute clear command inputted, the attribute of the entire area is stored as binary data in the attribute RAM 57 (steps P3 and P4) and execution returns to step P2. When a specified area, i.e. area specifying coordinates, and an attribute about that area are inputted from the pressure sensor 3 and any of the touch keys 32–36 located therebelow, the specified area and the attribute are stored in the attribute RAM 57 (steps P5 and P6) and execution returns to step P2. Further, upon input of a scan start command from the touch key 38, the lamp is turned OFF, the first and second mirrors 14 and 15 are moved to their retracted or stand-by positions, the mirror carriage frame 18 is moved to its scan start position, and the lamp 5 is turned ON (steps P7 to P10). Scan is started. An image signal which has been read is processed in accordance with the attribute of a corresponding area and a processed signal is outputted (step P11). Then, a check is made as to whether the scan of the image portion corresponding to one frame of the microfilm has been completed or not (step P12) and if the answer is affirmative, the lamp 5 is turned OFF, the mirror carriage frame 18 is moved to its stand-by position, the first and second mirrors are moved to their screen projecting positions, and the lamp 5 is turned ON (steps P13 to P16). Then, execution returns to step P2 for the next processing.

Although in the above embodiment the attribute RAM has a capacity corresponding to one frame of the microfilm, even a small memory capacity will do because the minuteness of area specifying is determined by the pitch (e.g. 1 mm) of the ultrafine wires of the pressure sensor 5.

Further, although the above embodiment is constructed so that contacts are disposed at four corners of each input unit area of the pressure sensor, a contact may be disposed in the interior of the unit area. In this case, specifying of one unit area on the screen can be made by turning ON the contact disposed in the interior thereof. Of course, in the case of specifying an area involving plural unit areas, this can be done by specifying two areas and allowing a rectangular area to be recognized which rectangular area involves those two areas as two corners on a diagonal line, as noted in the previous description.

In the present invention, as set forth above, an editing area, an attribute about that area and an operation command can be specified directly while looking at the image projected on the screen. Moreover, the film image is converted to an electric signal by the image pickup element and editing is made in accordance with the previously specified area and attribute thereof, so the image editing operation is easier than that in the conventional microfilm reader printers. Besides, it becomes possible to effect minute area specifying and editing. Further, since images are outputted as electric signals, it becomes easy to transmit them to a remote place or effect processing using an information processor.

Having described our invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A microfilm reader scanner which projects an image on a microfilm onto a screen for observing and onto an image sensor for obtaining image data, comprising:

an area specifying member in the form of a transparent sheet attached on said screen for specifying a desired area out of the projected image, said area specifying member producing signals corresponding to the positions where sheet is pressed;

an area judgement means to produce an area data based on the signals produced by area specifying member;

an attribute data input means for signifying an attribute of area specified by said area specifying member;

a memory means for storing said attribute data; and an editing means for editing the image data obtained by said image sensor based on said attribute data stored in said memory means and said area data produced by said area judgement means.

2. A microfilm reader scanner according to claim 1, wherein said area specifying member includes a couple of insulating transparent films each having a multitude of the conductive wire laid thereon in a predetermined pitch, the conductive wires on said film are overlapped through spacers with the conductive wires on another film disposed perpendicularly to form a matrix contact group.

3. A microfilm reader scanner according to claim 1, wherein said area judgement means judges a rectangular area having a diagonal line coinciding with a segment connecting two points specified by said area specified member and produces the area data of specified rectangular area.

4. A microfilm reader scanner according to claim 1, wherein said memory means has a memory area for storing the attribute data of one frame of the microfilm.

5. A microfilm reader scanner according to claim 1, wherein said image sensor outputs the image data for individual pixels thereof.

6. A microfilm reader scanner according to claim 5, wherein said memory means stores the attribute data of every unit of a virtual area which is defined for each unit as one of the areas obtained by dividing an image area of the screen regularly so as to have a larger area than that of one pixel.

7. A microfilm reader scanner according to claim 6, wherein said editing means processes a signal from an individual pixel of said image sensor by the attribute data stored in said memory means for a corresponding unit of the virtual area in which said pixel is included.

8. A microfilm reader scanner according to claim 1, wherein said attribute data is enable to indicate a white attribute to make the desired area white, when said white attribute is indicated, said editing means produces digital data of a constant level regardless of image data.

9. A microfilm reader scanner according to claim 1, wherein said attribute data is enable to indicate a reversal attribute of image data, when said reversal attribute is indicated, said editing means produces digital data being reversed from black to white or vice versa.

10. A microfilm reader scanner according to claim 1, wherein said editing means has an analogue-to-digital conversion means for converting analogue signals received thereby to digital signals, a comparator means for comparing each digital signal with a threshold value and a select means for selecting a fixed threshold value for bi-level processing or a multi-step threshold value memorized in dither matrix for half-tone processing by the attribute data stored in memory means.

11. A microfilm reader scanner which projects an image on a microfilm onto a screen for observing and onto an image sensor for converting the optical image into image signals for individual pixels thereof, comprising:

an area specifying means for generating an area signal in order to specify a desired area out of the projected image, said area specifying means including a transparent sheet, attached on the screen, which is regularly divided into a plurality of regions each having at least one electric contact to generate the area signal;

an area judgement means to produce an area data based on the signals produced by specifying means;

an attribute data input means for signifying an attribute of area specified by said area specifying means;

a memory means, having a plurality of memory areas corresponding to the regions of said transparent sheet, for storing the attribute data corresponding to the regions which are specified by the area signal as the desired area; and an editing means for processing an output signal from individual pixel of said image sensor by the attribute data stored in said memory means and said area data produced by said area judgement means.

12. A microfilm reader scanner according to claim 11, wherein said transparent sheet is divided into plural regions in the transverse direction of the screen and in the direction perpendicular thereto, each said region having electric contacts at four corners thereof.

13. A microfilm reader scanner according to claim 12, wherein said electric contacts comprise intersecting points of a plurality of perpendicularly intersecting conductive wires.

14. A microfilm reader scanner according to claim 12, wherein said memory means stores the attribute data in the memory areas corresponding to the regions included in the desired area with a segment as a diagonal line which segment joins two points specified by the area signals from two electric contacts.

15. A microfilm reader scanner according to claim 12, wherein said regions are each of a range larger than the pixel of said image sensor.

16. A microfilm reader scanner according to claim 11, wherein said attribute data is enable to indicate a white attribute to make the desired area white, when said white attribute is indicated, said editing means produces digital data of a constant level regardless of image data.

17. A microfilm reader scanner according to claim 11, wherein said attribute data is enable to indicate reversal attribute of image data, when said reversal attribute is indicated, said editing means produces digital data being reversed from black to white or vice versa.

18. A microfilm reader scanner according to claim 11, wherein said editing means has an analogue-to-digital conversion means for converting analogue signals received thereby to digital signals, a comparator means for comparing each digital signal with a threshold value and, a select means for selecting a fixed threshold value for bi-level processing or a multi-step threshold value memorized in dither matrix for half-tone processing by the attribute data stored in memory means.

* * * * *